United States Patent Office 3,767,780
Patented Oct. 23, 1973

3,767,780
PREPARATION OF MANGANESE OXIDES
Michael Bellas, Wigan, and William L. Seddon, Sale, England, assignors to Eastman Kodak Company, Rochester, N.Y.
No Drawing. Filed Feb. 3, 1972, Ser. No. 223,362
Int. Cl. C01g 45/02
U.S. Cl. 423—605　　　　　　　　　　　　　　7 Claims

ABSTRACT OF THE DISCLOSURE

A process for preparing manganic-manganous oxide ($Mn_3O_4$) by the oxidation in water of manganous hydroxide at elevated temperature and superatmospheric pressure. The water can contain ammonia, acetic acid, or ammonium acetate. The temperature can be between about 100 C. and about 140° C., and the pressure can be between about 40 and 70 p.s.i. Air or oxygen can be used as the oxidizing agent, and the suspension of manganous hydroxide in water or aqueous solution can be agitated during treatment. The resulting manganic manganous oxide can be recovered as filter cake after filtration of the reaction mixture.

FIELD OF THE INVENTION

This invention relates generally to a process for preparing manganese oxides and more particularly to a process for preparing manganic, manganous oxide ($Mn_3O_4$).

BACKGROUND OF THE INVENTION

Manganous hydroxide is obtained as a precipitate from manganous salt containing liquors. These liquors are produced as by-products from certain industrial oxidation processes. As for erample, in the preparation of quinone by oxidation of aniline as a step in the preparation of hydroquinone, highly oxidized manganese is used as the oxidizing agent. The manganous hydroxide obtained from these liquors may contain various impurities which should be removed.

It has been proposed that manganese compounds such as manganeous hydroxide can be recovered from liquors containing manganous salts by adding such liquors to an aqueous solution of ammonia with the pH of the solution being at least 10. The addition is continued until the pH falls to between 9.0 and 10.0. The precipitated manganous hydroxide is then recovered by filtration and converted to manganic manganous oxide ($Mn_3O_4$) by washing with water and blowing air or oxygen therethrough. The manganic manganous oxide obtained by the prior art processes is sometimes difficult to filter from the reaction medium because it is very finely divided. Such products may also be contaminated by high sulfate ion concentration.

SUMMARY OF THE INVENTION

It is therefore an object of the present invention to provide a new process for the preparation of manganic manganous oxide. Another object of this invention is to provide a process for preparing manganic manganous oxide that may be readily filtered from the reaction medium. A further object of the present invention is to provide an improved process for preparing manganic manganous oxide of improved quality.

These and other objects and advantages of this invention are accomplished by the oxidation of an aqueous suspension of manganous hydroxide at elevated temperature and superatmospheric pressure.

DETAILED DESCRIPTION OF A PREFERRED EMBODIMENT

The manganous hydroxide that may be used in the process of this invention may be obtained from any source. It may be obtained, for example, by adding a manganous salt-containing liquor to an aqueous solution of ammonia having a pH of at least 10. The manganous hydroxide will precipitate from the solution and it can be readily removed by filtration. The manganous hydroxide can also be precipitated from a mangaous salt-containing solution by adding alkali metal or alkaline earth metal hydroxides to the solution.

As indicated above, manganic manganous oxide ($Mn_3O_4$) can be obtained by suspending manganous hydroxide in water and simply blowing air or oxygen therethrough. As can be seen from the following Examples 1, 2 and 3 the product thus obtained is difficult to filter because it is very finely divided. As will also be noted in these examples, the reaction times are relatively long.

According to the present invention, the oxidation of manganous hydroxide is carried out at superatmospheric pressure, thereby increasing the partial pressure of the oxygen. The pressure is at about 40 p.s.i. to about 70 p.s.i. and preferably about 60 p.s.i. The oxidation which may be accomplished by the use of air or oxygen is also carried out at an elevated temperature of from about 100° C. to about 140° C. and preferably about 110° C.

The manganic manganous oxide produced is readily filtered. The reaction times are shorter than the prior processes, and the product obtained is less contaminated by sulfate ions than the product from the prior art processes.

By operating at the above elevated temperatures and superatmospheric pressures, it is possible to use freshly precipitated manganeous hydroxide which heretofore could not readily be used in the preparation of manganic manganous oxide ($Mn_3O_4$). Thus a wet filter cake of manganous hydroxide obtained as indicated above may be used. Such filter cake should be washed substantially free of any of the reaction mixture.

The oxidation of the manganous hydroxide is carried out by suspending the manganous hydroxide in purified or distilled water, thereby avoiding possible contamination from impurities found in tap water. It is also possible to use as the suspension medium dilute aqueous solution of ammonia, acetic acid, or ammonium acetate. The use of dilute ammonia solution produces a product having a lower sulfate content, but slightly higher magnesium and calcium content than the product obtained by using water alone. The use of dilute acetic acid reduces the calcium content.

The process of the present invention produces manganic manganous oxide having a very low sulfate ion content, (expressed as $SO_3$) of less than 0.5% by weight, thereby making the product suitable for the manufacture of ferrites. Using the prior art processes it was difficult to obtain a product having a sulfate ion content below about 1.0% by weight.

The invention will be further illustrated by the following examples. The first three are illustrative of prior art processes and the remaining illustrate the process of this invention.

Example 1

A manganous sulphate liquor (135 ml.) containing 200–250 grams/litre of $MnSO_4$ and 44–50 grams/litre of $(NH_4)_2SO_4$ was diluted with water (675 ml.) and added dropwise at a rate of 10 ml./minute to 500 ml. of a stirred dilute ammonia solution (10% 0.88 ammonia). Stirring was continued for 15 minutes after the addition had been completed, the precipitated manganous hydroxide was allowed to settle for 30 minutes, and then filtered.

A 35 g. portion of the wet filter cake was suspended in 600 ml. of purified water and air was bubbled therethrough at ambient temperature for 64 hours. The reaction mixture was filtered and the residue of manganic manganous oxide was dried and weighed. The yield and sulfate, magnesium and calcium content is shown in Table I.

Example 2

A 70 g. portion of the wet filter cake prepared in Example 1 was washed with three 1200 ml. portions of purified water, each washing operation taking 15 minutes. The washed manganous hydroxide was suspended in 200 ml. of purified water and air was bubbled therethrough at ambient temperature for 20 hours. The reaction mixture was filtered and the residue was dried and weighed. The yield and analysis of the product is shown in Table I.

Example 3

A 35 g. portion of a wet filter cake of manganous hydroxide prepared as described in Example 1 was washed with three 600 ml. portions of purified water, each washing operation taking 15 minutes. The washed manganous hydroxide was suspended in 800 ml. of purified water maintained at 55–60° C. and air was bubbled therethrough for 33 hours. The reaction mixture was filtered and the residue was dried and weighed. The yield of manganic manganous oxide and analysis is illustrated in Table I.

TABLE I

| Example | Yield of $Mn_3O_4$ (g.) | $SO_3$, percent | MgO, p.p.m. | CaO, p.p.m. |
| --- | --- | --- | --- | --- |
| 1 | 12.2 | 0.51 | 70 | 440 |
| 2 | 26.9 | 0.39 | 450 | 250 |
| 3 | 14.0 | 0.21 | 750 | 350 |

In each of Examples 4 to 11, a quantity of a wet filter cake of manganous hydroxide obtained by the method described in Example 1 was placed in a 2-litre autoclave in a quantity of liquid as shown in the following Table II. The autoclave was charged with air at a pressure of 60 p.s.i., closed, and heated to about 110° C. for the times shown in Table II while the contents were mechanically agitated. The reaction mixture from the autoclave was filtered and the product, manganic manganous oxide was dried.

The yields of manganic manganous oxide and the sulphate, magnesium and calcium contents thereof are shown in Table II.

treatment and of the manganic manganous oxide after the autoclave treatment are shown in Table III.

Example 13

203 ml. of a solution of manganous chloride (26 grams in 100 ml.) was diluted with 92 ml. of tap water, and sodium hydroxide solution (20 grams in 100 ml.) was added dropwise with stirring until the pH reached 9. Stirring was continued for a further 30 minutes and the precipitate of manganous hydroxide was then allowed to settle. The precipitate was filtered and washed with 230 ml. of distilled water.

The wet filter cake was then added to 600 ml. of purified water and treated in an autoclave under the conditions described in Examples 4 to 11 (except that the temperature was 90° C.) for three hours. The yield of manganic manganous oxide and the chloride and sodium contents of the manganous hydroxide before the autoclave treatment and of the $Mn_3O_4$ after the autoclave treatment are shown in Table III.

Example 14

To 203 ml. of manganous sulphate liquor as used in Example 1 was added 1,015 ml. of tap water. 750 ml. of 0.88 ammonia solution was added dropwise, with stirring, over a period of 45 minutes, and stirring was continued for a further 30 minutes. The pH of the solution was then 8.7. The precipitate of manganous hydroxide was allowed to settle, filtered, washed on the filter with purified water and filtered again.

The wet filter cake was added to 600 ml. of purified water and treated in an autoclave under the conditions described in Examples 4 to 11 (except that the temperature was 90 to 95° C.) for three hours. The yield of $Mn_3O_4$, and the sulphate and sodium contents of the manganous hydroxide before the autoclave treatment and of the $Mn_3O_4$ after the autoclave treatment are shown in Table III.

TABLE III

| | Manganous hydroxide | | | $Mn_3O_4$ | | | |
| --- | --- | --- | --- | --- | --- | --- | --- |
| Ex. | $SO_3$, percent | Cl, percent | Na, p.p.m. | Yield (g.) | $SO_3$, percent | Cl, percent | Na, p.p.m. |
| 12 | 18.1 | | 5,200 | 10.7 | 1.54 | | 107 |
| 13 | | 16.1 | 3,800 | 14.5 | | 0.47 | 263 |
| 14 | 19.6 | | 425 | 8.6 | 1.18 | | 33 |

TABLE II

| Example | Weight of wet filter cake of $Mn(OH)_2$ (approx.) (g.) | Liquid | Time in autoclave (hours) | Yield of $Mn_3O_4$ (g.) | $SO_3$, percent | MgO, p.p.m. | CaO, p.p.m. |
| --- | --- | --- | --- | --- | --- | --- | --- |
| 4 | 35 | Distilled water, 675 ml | 4.5 | 16 | 0.32 | 310 | 315 |
| 5 | 35 | do | 4.5 | 16 | 0.37 | 310 | 315 |
| 6 | 35 | Distilled water, 400 ml | 2.0 | 15.5 | 0.36 | 490 | 260 |
| 7 | 35 | do | 2.0 | 16.7 | 0.47 | 186 | 112 |
| 8 | 35 | Distilled water, 400 ml., conc. $NH_4OH$, 2 ml. | 2.0 | 15.5 | 0.08 | 2,500 | 250 |
| 9 | 35 | do | 2.0 | 17.0 | 0.20 | 2,230 | 546 |
| 10 | 35 | Distilled water, 400 ml., acetic acid, 0.12 ml. | 2.0 | 15.7 | 0.45 | 53 | 78 |
| 11 | 35 | Distilled water, 400 ml., acetic acid, 0.36 ml. | 2.0 | 14.9 | 0.20 | 800 | 254 |

A 135 ml. portion of the manganous sulphate liquor used in Example 1 was diluted with 61 ml. of purified water. An aqueous solution of sodium hydroxide (20 grams in 100 ml.) was added dropwise with stirring until the pH of the solution reached 9. The precipitate of manganous hydroxide which formed was allowed to settle for about an hour and was then filtered and washed with 200 ml. of purified water on the filter. The washed residue was placed in 500 ml. of purified water and left overnight, then placed in an autoclave under the conditions described in Examples 4 to 11 for three hours.

The contents of the autoclave were filtered and the residue dried in an oven at 110° C. The yield of manganic manganous oxide, and the sulphate and sodium contents of the manganous hydroxide before the autoclave The preceding Examples 4 to 14 illustrate the oxidation of manganous hydroxide in accordance with the invention in a closed autoclave in which there was a large air space above the mechanically agitated suspension of manganous hydroxide. As well as carrying out the oxidation in a closed system such as this, it is also possible to operate in an open system, such as a vessel to which air under pressure is introduced and from which air is vented at a certain pressure.

The particular elevated pressure and temperature at which any process in accordance with the invention is performed will vary, depending, for example, upon whether the process is performed in a closed or an open system, and upon the nature and extent of any mechanical agitation which is employed. A typical pressure is 40 to 60 p.s.i. and at a temperature of from 130–140° C.

An open system preferred for large scale operations, and is illustrated in the following Example 15.

Example 15

950 litres of a manganous sulphate liquor having a composition similar to the liquor used in Example 1 was diluted with 2625 litres of water and added with stirring over a period of one hour to an aqueous ammonia solution (2430 litres of a solution containing 35 grams of $NH_3$ per litre) which was maintained at 30° C. After the addition of all the solution, the reaction mixture, at a pH of 9.8, was stirred for a further 15 minutes, allowed to settle for 30 minutes, and then filtered. The filter cake, consisting of manganous hydroxide, was washed with 1230 litres of purified water.

The wet filter cake was then transferred to a vented pressure vessel with 900 litres of purified water, and the mixture was stirred vigorously at 120° C. for 4 hours while compressed air was injected to maintain a pressure of 40 to 70 p.s.i.g. in the vessel.

After cooling, the solid material was separated by decantation and washed by decantation with purified water (700 litres). The thickened washed slurry was then filtered by suction and dried for 24 hours at 110° C.

The product contained 0.27% sulphate (as $SO_3$), 2080 p.p.m. of magnesium (as MgO), and 140 p.p.m. of calcium (as CaO).

It can be seen from the foregoing that the process of this invention provides manganic manganous oxide of excellent yields and low impurity content.

The invention has been described in detail with particular reference to preferred embodiments thereof, but it will be understood that variations and modifications can be effected within the spirit and scope of the invention.

We claim:

1. A process for preparing manganic manganous oxide comprising the steps of suspending manganous hydroxide in a liquid selected from the group consisting of water, dilute aqueous solution of ammonia, dilute aqueous solution of acetic acid, and dilute aqueous solution of ammonium acetate, heating the suspension to an elevated temperature of between about 100° C. to about 140° C., introducing air or oxygen under superatmospheric pressure into said suspension for a period of time sufficient to oxidize the manganous hydroxide, and recovering the manganic manganous oxide.

2. The process according to claim 1 wherein the liquid is water.

3. The process according to claim 1 wherein the liquid is a dilute aqueous solution of ammonia.

4. The process according to claim 1 wherein the liquid is a dilute aqueous solution of acetic acid.

5. The process according to claim 1 wherein the liquid is a dilute aqueous solution of ammonium acetate.

6. A process for preparing manganic manganous oxide comprising the steps of suspending manganous hydroxide in water, heating the suspension to about 110° C., introducing air at about 60 p.s.i. into said suspension, maintaining the temperature of the suspension and continuing the air introduction for a period of time sufficient to oxidize the manganous hydroxide, and recovering the manganic manganous oxide.

7. The process according to claim 6 wherein the suspension is agitated during the heating and air introduction.

References Cited

FOREIGN PATENTS

| | | | |
|---|---|---|---|
| 1,019,072 | 2/1966 | Great Britain | 23—145 |
| 655,705 | 1/1963 | Canada | 23—145 |

OSCAR R. VERTIZ, Primary Examiner

H. S. MILLER, Assistant Examiner

PO-1050
(5/69)

UNITED STATES PATENT OFFICE
CERTIFICATE OF CORRECTION

Patent No. 3,767,780        Dated October 23, 1973

Inventor(s) Michael Bellas and William L. Seddon

It is certified that error appears in the above-identified patent and that said Letters Patent are hereby corrected as shown below:

Column 2, line 6, change "mangaous" to --manganous--;
Column 2, line 31, change "manganeous" to --manganous--;
Column 2, line 42, change "tion" to --tions--.
Column 3, Table II, Example 11, change "distilled water, 400 ml., acetic acid, 0.36 ml." to --distilled water, 400 ml., conc. $NH_4OH$, 1.0 ml., acetic acid, 0.36 ml.--.

Signed and sealed this 16th day of April 1974.

(SEAL)
Attest:

EDWARD M. FLETCHER, JR.
Attesting Officer

C. MARSHALL DANN
Commissioner of Patents